United States Patent [19]

Breimesser et al.

[11] Patent Number: 4,831,601
[45] Date of Patent: May 16, 1989

[54] APPARATUS FOR TRANSMITTING AND RECEIVING ULTRASONIC SIGNALS

[75] Inventors: Fritz Breimesser, Nuremberg; Bernd Granz, Oberasbach, both of Fed. Rep. of Germany

[73] Assignee: Siemens Aktiengesellschaft, Berlin and Munich, Fed. Rep. of Germany

[21] Appl. No.: 109,295

[22] Filed: Oct. 15, 1987

[30] Foreign Application Priority Data

Oct. 31, 1986 [DE] Fed. Rep. of Germany ....... 3637141

[51] Int. Cl.$^4$ .............................................. G01S 9/66
[52] U.S. Cl. ..................................... 367/88; 367/138; 73/626
[58] Field of Search ................. 73/624, 625, 628, 629, 73/633, 640, 641, 609, 618, 619, 620, 626, 627, 632; 29/25.35, 594; 310/322, 334, 357, 358, 359, 360, 367, 368; 367/88, 92, 103, 117, 119, 129, 137, 138, 140, 155, 157

[56] References Cited

U.S. PATENT DOCUMENTS

| | | | |
|---|---|---|---|
| 2,987,068 | 6/1961 | Branson | 367/138 |
| 3,881,164 | 4/1975 | Kossoff | 367/138 |
| 3,911,730 | 10/1975 | Nikias | 73/67 |
| 4,200,858 | 4/1980 | Takashima | 367/138 X |
| 4,437,033 | 3/1984 | Drepers | 367/155 X |
| 4,592,029 | 5/1986 | Altmann et al. | 367/7 |

FOREIGN PATENT DOCUMENTS

| | | | |
|---|---|---|---|
| 0053048 | 6/1982 | European Pat. Off. | 367/88 |
| 0070494 | 1/1983 | European Pat. Off. | 367/88 |
| 0177407 | 4/1986 | European Pat. Off. | |
| 3309218 | 9/1984 | Fed. Rep. of Germany | |
| 2332531 | 6/1977 | France | |
| 2546306 | 11/1984 | France | 367/140 |
| 0086999 | 5/1985 | Japan | 367/140 |
| 2005833 | 4/1979 | United Kingdom | |

OTHER PUBLICATIONS

"Acoustical Imaging", vol. 8, by Metherell, pp. 69-95 (1980).
"Ultrasonic Imaging", 3, (1981), pp. 62-82.
"Medical Physics", vol. 3, No. 5, Sep./Oct. 1976, pp. 312-318.

Primary Examiner—Brian S. Steinberger
Attorney, Agent, or Firm—Kenyon and Kenyon

[57] ABSTRACT

An apparatus for transmitting and receiving ultrasonic signals for an ultrasonic imaging device operating by the pulse echo method. There is arranged next to a linear array of ultrasonic transducer elements serving as ultrasonic transmitter, a matrix type array of ultrasonic transducer elements serving as ultrasonic receiver, the columns of which run parallel to the longitudinal direction of the linear array. By the use of the matrix type array of ultrasonic receivers it is possible to receive echo signals from a wide angle range and to discriminate them with respect to their scattering angle.

9 Claims, 2 Drawing Sheets

4,831,601

APPARATUS FOR TRANSMITTING AND RECEIVING ULTRASONIC SIGNALS

BACKGROUND OF THE INVENTION

The present invention relates to an apparatus for transmitting and receiving ultrasonic signals for an ultrasonic imaging device operating by the pulse echo method.

In the image-giving methods used in medical ultrasonic diagnostics which operate on the pulse echo principle, one evaluates primarily the information of the ultrasonic signals reflected back or scattered back at 180°. Ultrasonic signals which are scattered or reflected at an angle other than 180°, however, also contain valuable information about the tissue structure and can contribute to image quality improvement.

From "Ultrasonic Imaging", 3 (1981), pages 62–82, an apparatus for transmitting and receiving ultrasonic signals is known where an ultrasonic transmitter, the trasmitting surface of which forms the curved envelope surface of a truncated cone, annularly surrounds an ultrasonic receiver with circular disk-shaped receiving surface. The piezo-electric element of the ultrasonic transmitter consists of polyvinylidene fluoride, PVDF, as this is suitable, due to its mechanical flexibility, especially for making large-area transducers with a curved surface. By this design of the transmitting surface a focus linearly extended on the axis of the cone is produced. The punctiform tissue structures present on this line focus then produce spherical scattered waves, of which essentially the fraction scattered under the angle of $180° - \theta$, where $\theta$ is the cone aperture angle, gets back into the receiver. By this design and arrangement of the ultrasonic transmitters and receivers a high definition in depth is achieved. By a linear movement of the entire apparatus the line focus sweeps in the body a plane and a two-dimensional sectional image can be produced. With this apparatus, however, the scattering angle under which the ultrasonic signals are received is given by the geometric construction of the ultrasonic transmitter. Discrimination of the ultrasonic image according to different scattering angles is thus not possible during operation.

From "Medical Physics", Vol. 3, No. 5, Sept./Oct. 1976, pages 312–318, in particular pages 317–318, an apparatus for transmitting and receiving ultrasonic signals is known where again the ultrasonic transmitter and the ultrasonic receiver are set up spatially separated from each other. The ultrasonic receiver and ultrasonic transmitter each consist of a plurality of transducer elements. The ultrasonic receiver is a linear array which is surrounded by an annular array serving as ultrasonic transmitter. The individual transducer elements of the annular array are operated with different transmitting power in accordance with their angular position relative to the longitudinal direction of the linear array. The transducer elements, whose connecting line to the center of the annular array lies parallel to the longitudinal direction of the linear array, then emit with maximum intensity of sound. In this manner a sound beam is produced, which is fanned out wide in the plane perpendicular to the transmitting surface and parallel to the longitudinal direction of the linear array, and which is narrow in the direction perpendicular thereto. In addition, the transmitted sound beam as also the focus of the linear array serving as ultrasonic receiver can be pivoted by electronic delay means parallel to the longitudinal direction of the linear array. With this apparatus one obtains good resolution in both lateral directions. With the mentioned apparatus, ultrasonic signals are indeed received from an angle range correlated with the pivoting range of the linear array, but the ultrasonic signal scattered or reflected under different scattering angles are composed to form a joint two-dimensional image.

SUMMARY OF THE INVENTION

It is an object of the present invention to provide an apparatus for transmitting and receiving ultrasonic signals with which echo signals can be received from a wide angle range and which makes it possible to discriminate the received ultrasonic signals with respect to their scattering angle.

The above and other objects of the invention are achieved by an apparatus for transmitting and receiving ultrasonic signals for an ultrasonic imaging device operating by the pulse echo method, comprising ultrasonic transmitter means comprising a linear array of ultrasonic transducer elements, the linear array having side faces lying parallel to the longitudinal direction and perpendicular to a transmitting surface of the linear array, next to at least one of the side faces of the linear array, there being disposed an ultrasonic receiver comprising a matrix type array of ultrasonic transducer elements having rows and columns, the columns extending parallel to the longitudinal direction of the linear array and the extent of the columns in the longitudinal direction being at least approximately equal to the length of the linear array.

By these design features it is ensured that the ultrasonic signals scattered and reflected under a smaller angle than 180° can be received. The minimum scattering angle under which the scattered ultrasonic signals can still be received depends essentially on the extent of the matrix type array, on the depth position in the object of the reception focus produced by the ultrasound receiver, and on the geometric arrangement of the matrix type array relative to the linear array. Depending on their position in the row, the individual transducer elements of a row of the matrix type array receive scattered signals from a given focus region in the object under different angles. Owing to this, by suitable circuitry measures, several ultrasound images can be produced, to the construction of which ultrasonic signals from different scattering angle ranges have contributed.

In a particularly advantageous form of the invention, there is arranged next to each of the two sides of the linear array serving as ultrasonic transmitter a matrix type array serving as ultrasonic receiver. In particular when examining objects with a curved surface it may be desirable to incline the receiving surface of the matrix type array toward the transmitting surface of the linear array.

Due to the separate setup of the ultrasonic transmitter and ultrasonic receiver, the piezo-electric materials used for the transmitter and for the receiver may be different. For ultrasonic transducer elements which are to be used primarily for transmitting, piezo-ceramic materials are especially suitable because of their high relative dielectric constant. In an advantageous realization of the ultrasonic receiver, the piezoelectrically active region of the receiving transducers consists of polarized polyvinylidene fluoride, PVDF.

In an advantageous variant of the invention it is expedient to use the linear array additionally as ultrasonic receiver. It is thus possible to compare the ultrasonic image produced with the scattered signals from different angles with the normal ultrasound-B image that is produced by a linear array as transmitting/receiving transducer and that is familiar in the art.

BRIEF DESCRIPTION OF THE DRAWINGS

For a more detailed explanation of the invention, reference is made to the drawings, in which.

DETAILED DESCRIPTION

Figure 1:
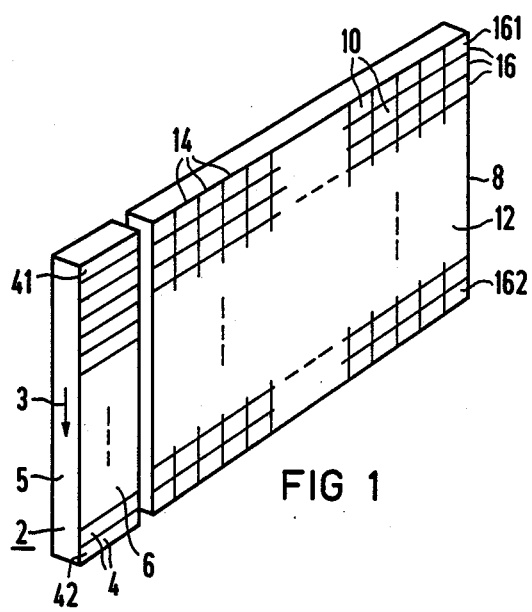
FIG. 1 shows schematically an apparatus according to the invention.

According to FIG. 1, the apparatus for transmitting and receiving ultrasonic signals contains an ultrasonic transmitter comprising a linear array 2. The linear array 2 contains a plurality of transducer elements 4 arranged one behind the other in longitudinal direction. Next to one of the side faces 5, which lie parallel to the longitudinal direction 3 and perpendicular to the transmitting surface 6 of the linear array 2, a matrix type array 8 is disposed, which contains a plurality of transducer elements 10 arranged in mutually perpendicular columns 14 and rows 16. The columns 14 run approximately parallel to the longitudinal direction 3 of the linear array 2. The extent of the matrix type array 8 in longitudinal direction 3 is at least approximately equal to the length of the linear array 2. The first and the last lines, 161 and 162 respectively, of the matrix type array 8 are arranged approximately at the level of the first and last transducer elements, 41 and 42 respectively, of the linear array 2. The matrix type array 8 serves as ultrasonic receiver, and its receiving surface 12 and the transmitting surface 6 of the linear array 2 lie, in the embodiment according to FIG. 1, in a common plane.

In a preferred form of realization, the piezoelectrically active region of the transducer elements 4 of the linear array 2 consists of a piezoceramic material, for example, lead-zirconate-titanate, PZT. A linear array 2 provided with piezoceramic transmitting transducers has, for example, a frequency band width of about 0.5 MHz and a center frequency in the range of about 2 to 10 MHz. Depending on the practical case, the proper linear array 2 can be selected and replaced in accordance with the desired center frequency. The transducer elements 10 of the matrix type array 8 contain as piezoactive material preferably polarized polyvinylidene fluoride, PVDF. A matrix type array 8 provided with piezopolymer receiving transducers has a high frequency band width of about 10 MHz and can be used as ultrasonic receiver for almost all ultrasonic frequencies customary in medical diagnostics.

In a preferred form of realization, the linear array 2 contains, for example, about 100 transducer elements and the matrix type array 8 has about 100×100 transducer elements. However, the number of rows 16 of the matrix type array 8 need not necessarily match the number of transducer elements of the linear array 2.

Figure 2:
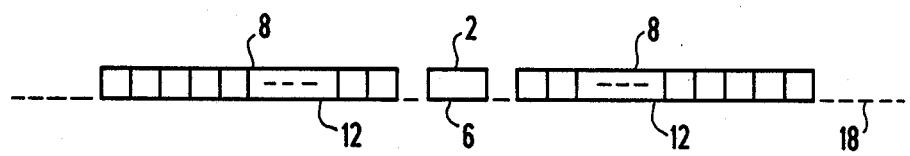
FIGS. 2 and 3 show two especially advantageous geometric arrangements of the linear array and of the matrix type array.

In the arrangement according to FIG. 2, two matrix type arrays 8 are provided next to the linear array 2. The transmitting surface 6 of the linear array 2 and the receiving surfaces 12 of the matrix type array 8 form a common plane 18.

Figure 3:
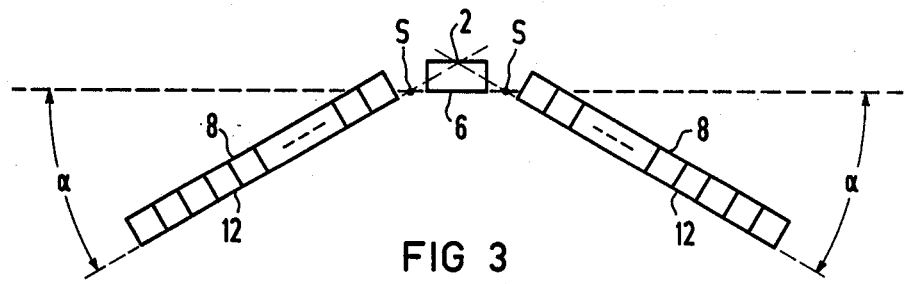

In the advantageous form of realization according to FIG. 3, the receiving surfaces 12 of the matrix type arrays 8 are inclined on the transmitting surface 6 of the linear array 2 by an acute angle alpha. The straight lines of the plane formed by the transmitting surface 6 intersecting the planes given by the receiving surfaces 12 extend perpendicular to the plane of the drawing and hence parallel to the longitudinal direction 3 of the linear array 2 and traverse the plane of the drawing at the points of intersection marked S.

Figure 4:
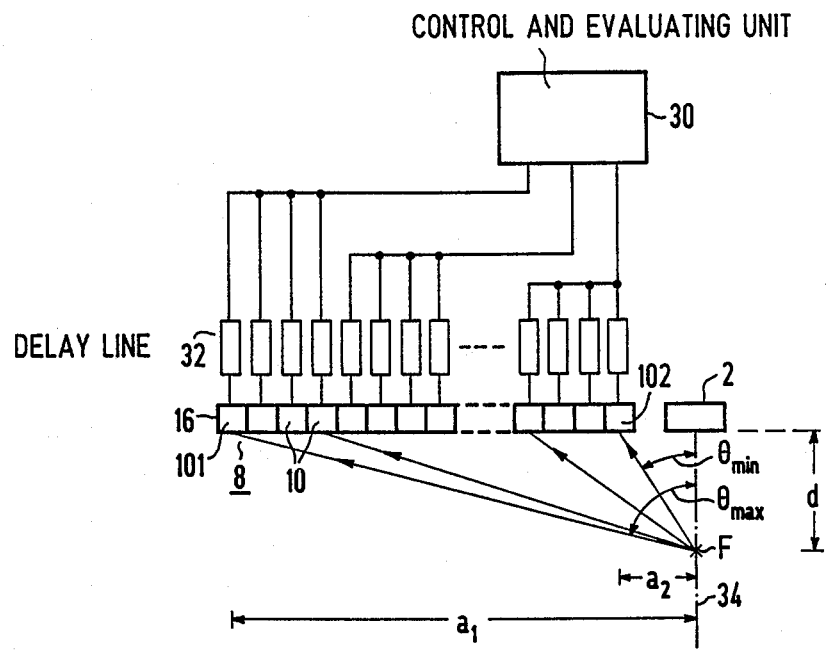
FIG. 4 shows a preferred mode of operation of the apparatus of the invention.

According to FIG. 4, the individual transducer elements 10 of a row 16 of the matrix type array 8 are provided with electronically controllable delay lines 32, so that by means of an electronic control and evaluating unit 30 a synthetic focus F can be formed, which can be moved electronically along the beam axis 34 of the linear array 2. The maximum and minimum scatter angles $\theta_{max}$ and $\theta_{min}$ depend on the depth d of focus F as well as on the distance $a_1$ of the transducer element 101 farthest away from the linear array 2 or respectively on the distance $a_2$ of the transducer element 102 of a row 16 adjacent to the linear array 2. In a preferred form of realization, the transducer elements 10 of a row 16 may be combined in several groups and be evaluated separately, as is illustrated with four transducer elements 10 in each instance in FIG. 4 for elucidation. The combination of the signals received by a group may alternatively, contrary to the hardware wiring illustrated in FIG. 4, take place in the computer in software form. One advantage of this is that it allows in principle free selection of the group size. The groups formed within a row correspond to different scattering angle ranges, so that according to the number of groups different ultrasound images can be produced. As the angle dependence of the scatter cross-section of small bodies depends in a characteristic manner on their geometric dimension, discrimination according to the size of the scatter centers in the object can thus be carried out. The scan in longitudinal direction 3 of the linear array 2 can occur in that the transmitting ultrasonic transducer elements 4 as well as the receiving row 16 are moved onward step by step. In an advantageous form of realization, the linear array 2 may also be set up as a "phased array" with which a sectional plane of the object is scanned on the principle of an electronic sector scan.

Figure 5:
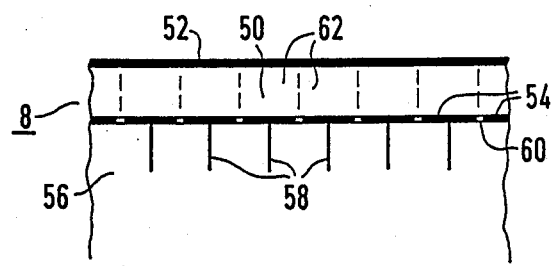
FIG. 5 shows schematically in section the preferred layout of the piezoactive region of a matrix type array.

According to FIG. 5, in an advantageous realization of a matrix type array 8 as disclosed in detail, for example, in German Patent Application No. 32 24 026, a support 56 for a PVDF foil 50 is provided at its side faces with electrodes 54 arranged in matrix form, which are separated from one another by an electrically insulating interstice 60. From the electrodes 54 connecting conductors 58 lead to preamplifiers not shown in the figure. The polarized PVDF foil 50 is applied on the electrodes 54. The flat side of the PVDF foil 50 opposite the electrodes 54 is provided with an electrically conductive layer 52. Each electrode 54 thus has an active volume region 62 correlated to it which corresponds to a single transducer element of the matrix type array 8. By these design features large-area and sensitive receiving arrays can be produced by a simple manufacturing technology.

In the foregoing specification, the invention has been described with reference to exemplary embodiments thereof. It will, however, be evident that various modifications and changes may be made thereunto without departing from the broader spirit and scope of the invention as set forth in the appended claims. The specification and drawings are, accordingly, to be regarded in an illustrative rather than in a restrictive sense.

What is claimed is:

1. Apparatus for transmitting and receiving ultrasonic signals for an ultrasonic imaging device operating by the pulse echo method, comprising:

ultrasonic transmitter means comprising a linear array of ultrasonic transducer elements, said linear array having a length in a longitudinal direction and having side faces lying parallel to the longitudinal direction and perpendicular to a transmitting surface having a normal direction perpendicular to the longitudinal direction, next to at least one of the side faces of the linear array there being disposed an ultrasonic receiver comprising a matrix array comprising ultrasonic transducer elements, said matrix array having rows and columns, the columns extending parallel to the longitudinal direction of the linear array and having an extent in the longitudinal direction, and the extent of the columns in the longitudinal direction being at least approximately equal to the length of the linear array.

2. The apparatus recited in claim 1, wherein, next to each of the two side faces of the linear array, a matrix array is disposed.

3. The apparatus recited in claim 1, wherein said matrix array has a receiving surface, the receiving surface of the matrix array and the transmitting surface of the linear array lying at least approximately in a common plane.

4. The apparatus recited in claim 2, wherein:

the matrix arrays each have receiving surfaces, the receiving surfaces of the matrix arrays and the transmitting surface of the linear array being inclined toward each other such that the planes formed by the receiving surfaces of the matrix arrays intersect the plane formed by the transmitting surface of the linear array in a straight line which extends parallel to the longitudinal direction of the linear array, and angles of inclination between the two receiving surfaces and the transmitting surface are acute and at least approximately equal.

5. The apparatus recited in claim 1, wherein:

the matrix array has a receiving surface, the receiving surface of the matrix array and the transmitting surface of the linear array being inclined toward each other such that the plane formed by the receiving surface of the matrix array intersects the plane formed by the transmitting surface of the linear array in a straight line which runs parallel to the longitudinal direction of the linear array, and an angle of inclination between the receiving surface and the transmitting surface is acute.

6. The apparatus recited in claim 1, where the linear array also comprises an ultrasonic receiver.

7. The apparatus recited in claim 1 wherein a piezoceramic material is provided as a piezo-electrically active region of the ultrasonic transducer elements of the linear array.

8. The apparatus recited in claim 1, wherein the ultrasonic transducer elements of the matrix array comprise a piezo-electrically active region comprising polarized polyvinylidene fluoride.

9. The apparatus recited in claim 8, wherein the ultrasonic transducer elements of the matrix array comprise a matrix arrangement formed by a cohering polyvinylidene fluoride foil having flat sides, a matrix electrode arrangement being coupled to one of the flat sides.

* * * * *